June 17, 1969     H. J. ABRAMSON     3,449,887
AUTOMATIC HEAT SEALING DEVICE
Filed March 29, 1967     Sheet 1 of 4
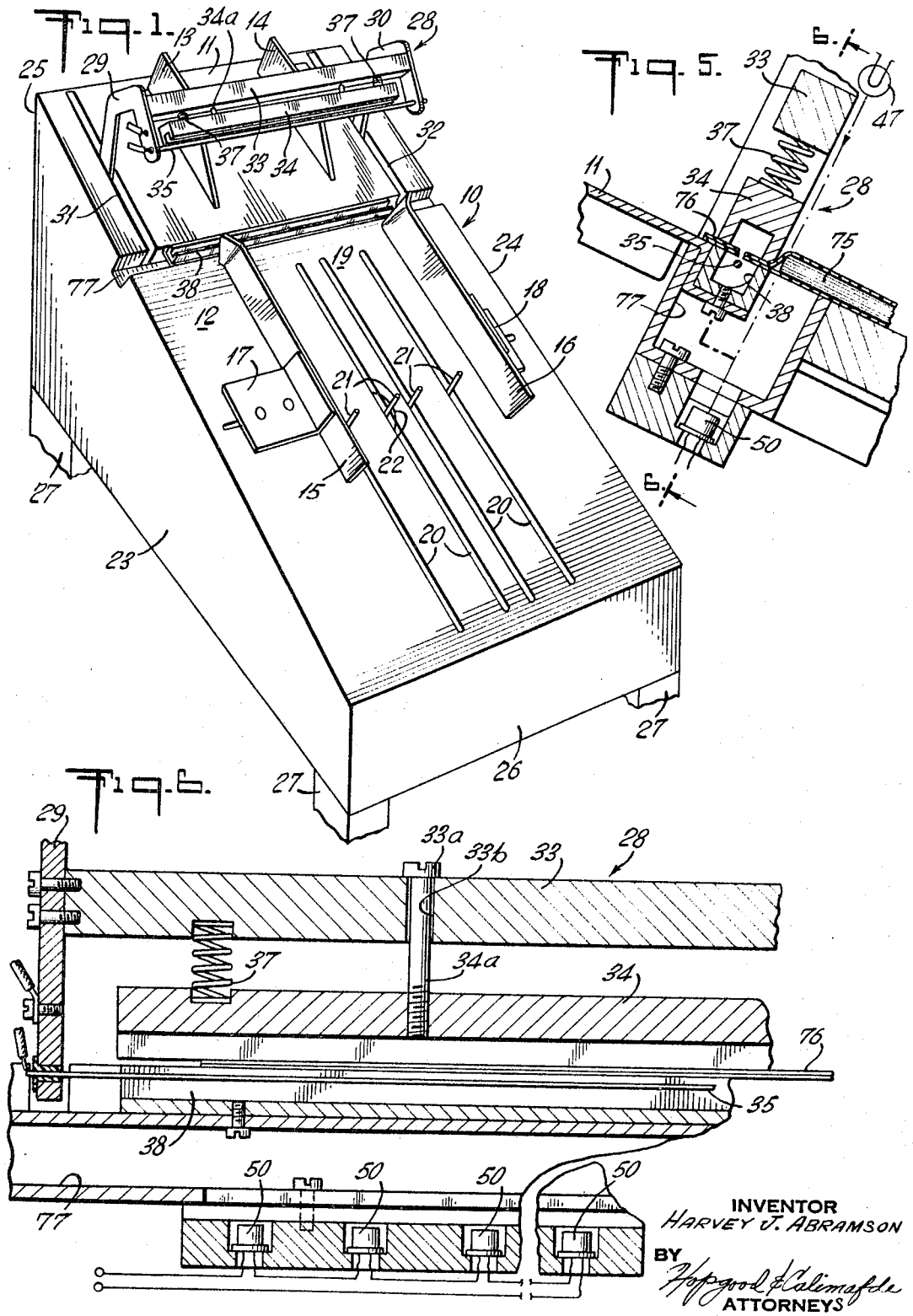
INVENTOR
HARVEY J. ABRAMSON
BY
Hopgood & Calimafde
ATTORNEYS

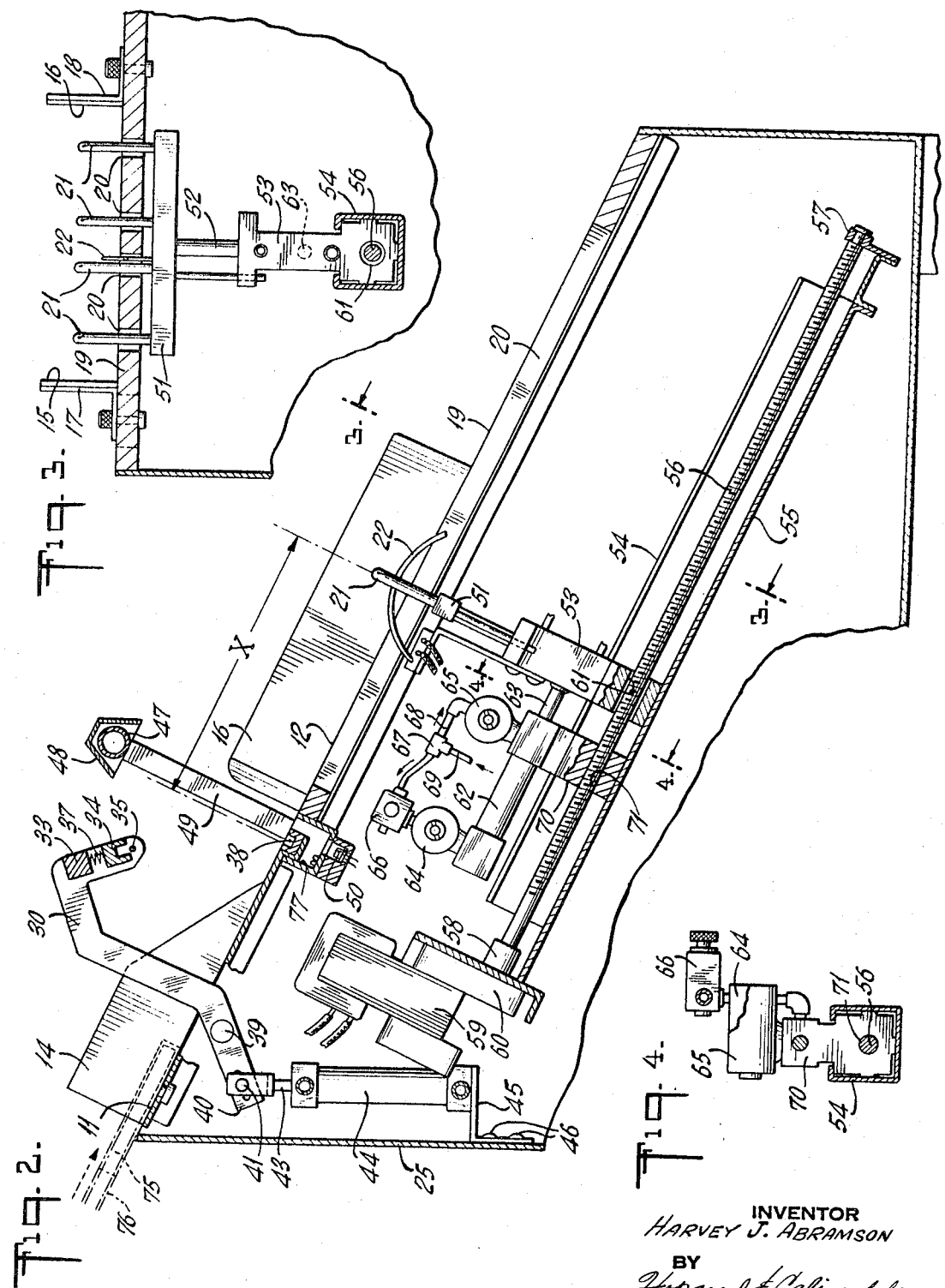

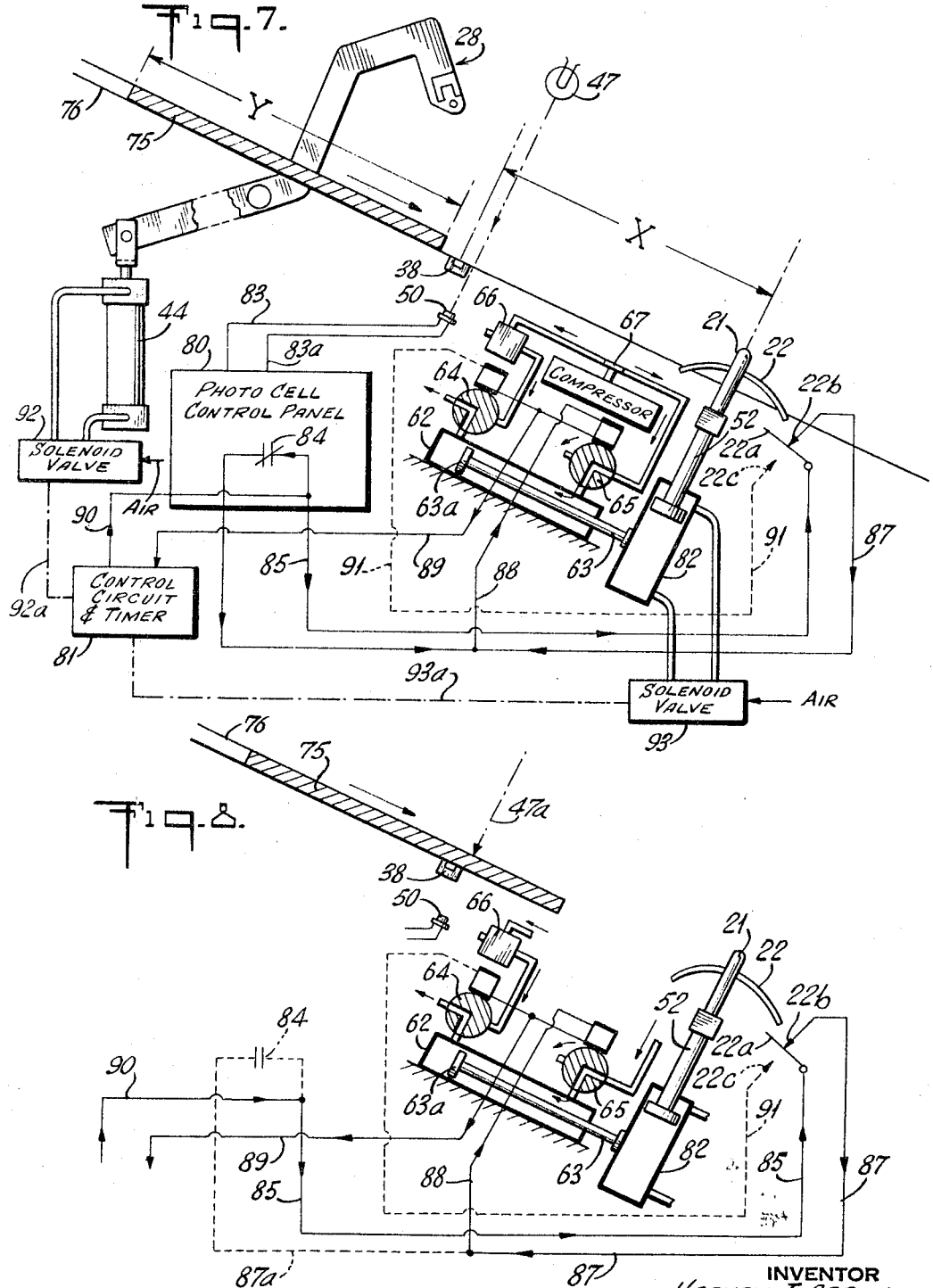

United States Patent Office 3,449,887
Patented June 17, 1969

3,449,887
AUTOMATIC HEAT SEALING DEVICE
Harvey J. Abramson, New York, N.Y., assignor to American Technical Machinery Corp., Mount Vernon, N.Y., a corporation of New York
Filed Mar. 29, 1967, Ser. No. 626,800
Int. Cl. B65b 57/02, 51/10
U.S. Cl. 53—76
10 Claims

ABSTRACT OF THE DISCLOSURE

An automatic device is disclosed for heat sealing packages, the device having a platform for receiving packages to be sealed, the platform being provided with stop means for indexing the package in the sealing position. The package is moved along the platform until it reaches the stop means. The stop means is coupled to an indexing means which is responsive to a signal for indexing the package to a position to accommodate the length of a package, the package being an article confined in a heat sealable polyethylene or similar plastic bag. A sealing station together with sealing means is located forward of the stop means for sealing the bag, when the bag has been correctly positioned via the stop means. A control circuit responsive to a signal is employed to carry out the complete sealing cycle when the correct position of the packaged bag has been determined and set.

---

This invention relates to an automatically operable heat sealing device for sealing plastic containers having articles confined therein and, in particular, to a device for sealing packages comprising bags of the polyethylene or similar type for protectively packaging articles.

Polyethylene and similar plastic bags are in widespread use for packaging a diversity of articles, such as foods, handkerchiefs, shirts, books, magazines, and the like. The bags being generally transparent are useful in that the confined articles are readily discernible and, additionally, because the bags are readily heat-sealable. Devices are known for heat sealing polyethylene packages, but generally such devices require the presence of operators and/or special devices to insure proper heat sealing position of the packages having varying lengths.

It would be desirable to have a heat sealing device which is automatically operable and which is capable of sealing packages of different lengths, such as might occur when ladies' and men's handkerchiefs are packaged for heat sealing by the same device during the same production run.

It is thus the object of the invention to provide an automatically operable heat sealing device.

Another object is to provide a heat sealing device capable of automatically heat sealing polyethylene and similar plastic bags containing articles of different lengths.

These and other objects will more clearly appear from the following disclosure and the accompanying drawings, wherein:

FIG. 1 illustrates in perspective the external configuration of one embodiment of the heat sealing device provided by the invention;

FIGS. 2 to 6 show in elevation cross-sections of portions of one embodiment of the device; and FIGS. 7 to 10, which depict schematically in elevation the device and associated circuitry, illustrate the steps constituting the heat sealing cycle of the device.

Figure 9:
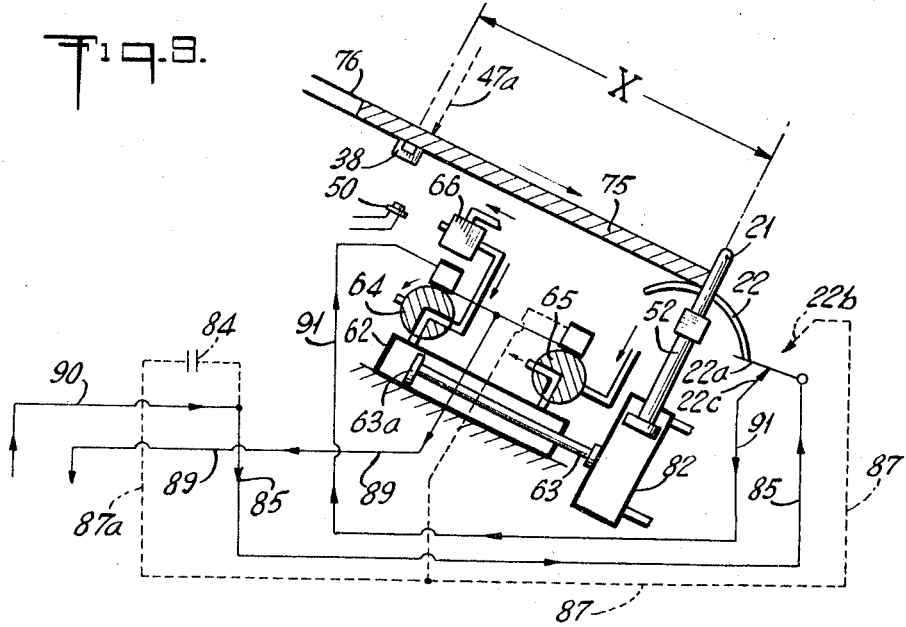

Stating it broadly, the invention provides an automatically operable heat sealing device for sealing packages comprising articles confined in a heat sealable envelope, such as a polyethylene bag. Briefly, one aspect of the device is made up of a sealing platform for receiving packages to be sealed and a movably mounted stop means located at the heat sealing platform for correctly positioning the package prior to heat sealing, the movable stop means being indexed at a home position corresponding to the shortest length package, but being automatically indexible via indexing means to a position to accommodate a package of longer length, the heat sealing device having associated with it means for producing a signal to which the control circuit responds when the package has reached the correct sealing position on the platform. The sealing means is located forward of the stop means relative to a sealing station, the sealing means being actuated when the cycle is initiated by a signal set up by means of an actuating switch. Advantageously, a photoelectric device is employed as a monitor so that when the package has been correctly positioned, the photoelectric device together with the actuating switch enables the activation of a control circuit and timer, which timer is pre-set to initiate the full heat sealing cycle. The foregoing will be more clearly understood from the description of an embodiment of the invention which follows.

Referring to the drawing, FIGURE 1 shows one embodiment of a heat sealing device 10 with an inclined entry surface 11 coextensive with a downwardly sloping heat sealing platform 12, the entry surface having a pair of side guides 13, 14 between which the package is guided as it moves by gravity or other means to sealing platform 12 which also has a pair of side guides 15, 16, held by brackets 17, 18 on each side of runway 19 of the sealing platform. The sealing platform 12 has four slits 20 along the runway through which movably mounted stop means 21 project, said stop means having cooperably associated therewith an actuating microswitch 22 biased in one of two positions.

The device comprises a cabinet having side walls 23, 24 and end walls 25, 26, the cabinet having supporting legs 27 depending therefrom. At the entry surface, a pivotally mounted sealing bracket 28 is provided having hook-shaped side arms 29, 30 extending from within the device through slits 31, 32, the side arms being joined by a cross member 33 supporting an upper inverted channel member 34 and an electrical resistant heating wire 35, the channel 34 being spring mounted via springs 36, 37, the pivotally mounted bracket and associated elements being more clearly shown in FIGURES 2, 5 and 6 to be described later. A corresponding oppositely disposed lower channel 38 is provided at the sealing station for receiving the hot sealing wire 35 when the sealing bracket 28 is caused to pivot into sealing position which is completed when the hot wire enters the space in channel 38 after sealing an open bag overlapping the channel.

The sealing device is shown in cross section in FIGURE 2, the entry surface 11 being shown inclined to the horizontal and being substantially coextensive with inclined sealing platform 12 comprising runway 19. Side arm 30, which is the same as side arm 29, is shown mounted at pivot 39, the lower end of the arm 40 being slotted and coupled via a riding pivot bolt 41 to a fork 42 connected to piston stem 43 of pneumatic cylinder 44 supported via lug 45 connected by fasteners 46 to end wall 25. Mounted over the platform (FIG. 2) is a glow lamp 47 within an elongated reflector 48 spanning the width of the platform, the lamp and reflector being supported by legs 49 projecting upwardly from each side of the surface of the platform. The lamp is used in conjunction with a group of photoelectric cells 50 (note also FIG. 6) located near or at the sealing junction defined by channel 38.

Stop means 21 (FIG. 1 to 3) project from across member 51 through slits 20 (FIG. 3), cross member 51 being in turn fixed to a piston stem 52 which projects from a pneumatic cylinder (FIG. 7) hidden by body support 53, which support is slidably mounted within an elongated channel bracket 54 (FIG. 3). In FIG. 2, channel bracket 54 runs along downwardly sloping shelf 55 within the cabinet, which channel has running coaxially through it a threaded member 56 rotationally supported at 57 at the end of the shelf and at bearing 58 at the opposite end. A drive motor 59 is provided for rotating threaded member 56 by any conventional transmission means 60. Body support 53 (FIG. 3) of stop means 21 has an opening 61 at its lower position through which threaded member 56 passes, the opening being large enough to provide frictionless clearance. Connected to body support 53 is a stop indexing means comprising a pneumatic cylinder 62, the connection being via piston stem 63 floatingly supported within the pneumatic cylinder. The cylinder is provided at each end thereof with solenoid-operated air inlet and exit valve means 64 and 65, valve 64 being coupled to an air flow control valve 66 which in turn is coupled to a T 67, one end of which is coupled via an air by-pass 68 to valve means 65, the other end of which is coupled to air inlet 69 from a compressor (not shown). A support member 70 extends downwardly from valve 65 and has a threaded opening 71 which rides threaded member 56. For convenience, the cylinder 62, valves 64, 65 and body support 53 are referred to as the stop indexing means or assembly.

By actuating motor 59 in FIG. 2, threaded member 56 is caused to rotate and drive the stop means assembly in either direction along member 56. The purpose of the drive is to enable setting the stop means assembly at a particular minimum distance or home position from the sealing station of lower channel 38 to accommodate the minimum sized package that might be contained in a production run. Once this setting is made for a particular sealing run, it is maintained. However, the stop means is capable of automatically setting itself to a longer distance from home position to accommodate longer packages. Thus, referring to FIG. 2, the minimum distance would be that shown by X. However, the assembly may be caused to move to the right by means of indexing stem 63 actuated by pneumatic cylinder 62 in accordance with a signal determined by the activation or de-activation of photoelectric cell 50 by lamp 47 (note FIG. 5) in addition to the activation of switch 22. A package 75 to be sealed is shown moving down the slope (FIG. 2), said package being an article enclosed within a polyethylene bag having an open end 76 to be sealed.

Before describing the sealing cycle illustrated by FIGS. 7 to 10, reference is made to FIGS. 5 and 6 which are enlarged cross sections in elevation of sealing bracket 28 and a portion of the sealing platform. Thus, FIGS. 5 and 6 show cross member 33 supporting upper channel 34 via head 33a of bolt 34a threadedly fixed to the top portion of channel 34 and passing through opening 33b of cross member 33. The upper channel is spring mounted via spring 37 to provide some give when sealing wire 35 is brought down into lower channel 38 to effect sealing of the bag 76 as shown in FIG. 5. A larger channel 77 is disposed laterally across the platform, the bottom of the channel having sockets supporting photoelectric cells 50 coupled in series and capable of being excited via laterally arranged longitudinal lamp 47 when the trailing edge of opaque package 75 passes beyond the line of sight between lamps 47 and cells 50. When a package has been correctly positioned, and there is a clear line of sight between lamp 47 and photocells 50, and microswitch 22 has been depressed, a heat sealing cycle is initiated via a preset timer indicated schematically in FIG. 7. As illustrative of the sealing cycle, reference is made to FIGS. 7 to 10 which are schematic representations of the basic elements making up the combination.

Referring first to FIG. 7, wherever possible, like numerals are employed for the elements, even though the elements are schematically shown. Package 75 enclosed within a polyethylene bag having an open end 76 is shown moving by gravity down the incline beneath sealing bracket 28 which is in the up position. The package has a length Y greater than the minimum distance X at which the stop means assembly is indexed. Before the package reaches the sealing station or junction, lamp 47 sees cell 50. Actuating switch 22 is up, solenoid operated valve 64 is de-energized to vent and solenoid operated valve 65 opened to compressed air from the compressor which is also shown schematically. Cell 50 is shown coupled to photocell control circuit 80, said photocell circuit being electrically associated with control and timer circuit 81.

At this stage of the initial cycle, piston head 63a in pneumatic cylinder 62 is to the left, that is stop means 21 is in home position. Stem 52 of pneumatic cylinder 82 is in the raised position so that stop means 21 projects in the path of travel of the package. The positioning of these elements is determined by the control circuit (FIG. 7) as follows:

Cell 50 is coupled via lines 83, 83a to photocell control circuit 80 having a normally closed switch 84 coupled via line 85 through switch 22a and thence by lines 87 and 88 to solenoid valve 65 and return line 89 to control timer and circuit 81 which is coupled to line 85 of the photocell circuit via line 90. Thus, solenoid valve 65 is in the energized condition, whereas solenoid 64 is deenergized since line 91 is deactivated. Control circuit 81 controls the operation of the pivotally mounted sealing bracket by means of a timer through line 92a via solenoid valve 92 which is coupled to pneumatic cylinder 44 (shown schematically) and controls pneumatic cylinder 82 of the stop means 21 through line 93a via solenoid valve 93.

Referring now to FIG. 8, as package 75 moves further down the slope, the line of sight 47a is interrupted as shown and normally closed switch 84 of the photocell circuit is open. Switch 22 which is adapted to contact switch element 22a remains in the up position. Solenoid valve 64 remains de-energized while solenoid 65 remains energized. Line 87a, being connected to open switch 84, is deactivated.

Figure 10:
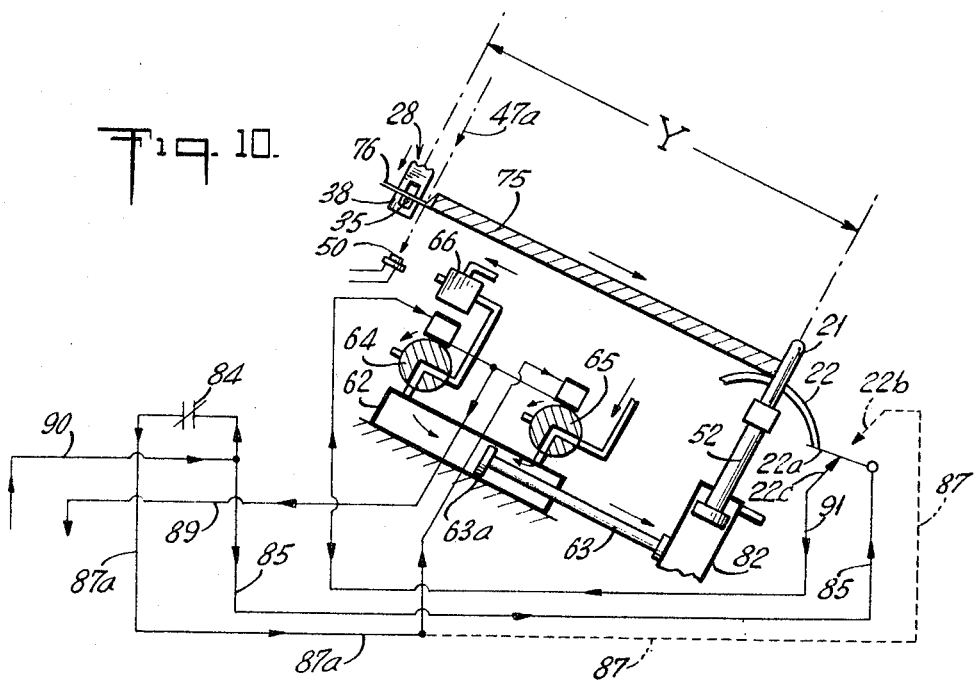

Referring to FIG. 9, as package 75 reaches stop 21, the line of sight 47a from the lamp is still interrupted, since the package is larger than the minimum distance X at which stop 21 is initially set. The package now depresses switch 22 which actuates and deflects corresponding switch element 22a from pole 22b to 22c. Thus, line 87 leading to solenoid valve 65 is deactivated, causing solenoid valve 65 to de-energize and pass air from pneumatic cylinder to vent. Meanwhile, solenoid valve 64 is energized to pass compressed air from control valve 66 through solenoid valve 64 to the opposite end of pneumatic cylinder 62, whereby to move piston head 63a to the right together with the stop means assembly, such that stop means 21 moves further down the slope, as shown in FIG. 10, to accommodate the longer package.

As stop means 21 moves to a new position Y, the trailing edge of package 75 clears the sealing junction, whereby the line of sight 47a from the lamp passes through the transparent portion of the open bag portion to excite photocell 50 which closes photocell switch 84 and energizes solenoid valve 65. The preset timer of control circuit 81 is immediately energized and runs from the preset time to zero in completing the cycle. Air immediately flows to the right side of pneumatic cylinder 62 to cushion and brake the movement of the piston; sealing bracket 28 with sealing wire 35 pivots downward as the timer activates solenoid valve 92; and upon completion of the sealing, the sealing bracket is returned to home position and solenoid valve 93 actuated to cause stop pins 21 to descend below the surface of the cabinet and release the package to discharge. Control valve 66 is set to maintain the pressure through solenoid valve 64 at a few pounds less than the air passing through solenoid 65.

After discharge of the sealed package, switch 22 returns to the up position, while switch element 22a returns to the other contact as in FIG. 7. When the timer completes the cycle, that is, returns to zero, it automatically resets itself, returns sealing bracket to home position, causes pins 21 to return to the up position and move the stop means assembly to home position as in FIG. 7.

The timer indicated in the block diagram of FIG. 7 may be of any conventional type well known for the purpose. The timer may be set at a total heat sealing cycle time of, for example, two seconds, depending on the time required to fulfill a complete sealing cycle. Thus, summarizing the operation, the moment the package has been correctly positioned by the automatically indexible stop means and the line of sight of the photocell is cleared, which results in a signal, the timer starts to move from the preset time to zero. During the time cycle, solenoid valve 92 is activated to bring down heat sealing bracket 28 to seal the bracket and when the timer reaches zero, the heat sealing bracket is returned, solenoid 93 is activated to lower stop pins 21 to release the package and then return to its former position, and solenoid valves 64, 65 activated to return the stop pin assembly to the minimum indexed position.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An automatically operable heat sealing device for sealing packages which comprises, a platform for receiving a package to be sealed, a sealing station located on said platform, an indexible stop means located relative to the surface of said platform for positioning a package for sealing, said stop means being indexed in home position, indexing means responsive to a signal for automatically indexing said stop means to another position to accommodate a particular sized package, sealing means located relative to said sealing station, and a control circuit coupled to said sealing means and said indexing means responsive to a signal produced when a package has reached a correct sealing position on said platform.

2. The device of claim 1 wherein a switch is provided in the control circuit which is actuated to produce a signal when said package has reached a correct sealing position.

3. The device of claim 2 wherein a monitor is employed coupled to said control circuit for sensing when the package to be sealed is in the correct position.

4. The sealing device of claim 3 wherein said monitor is a photoelectric device mounted to scan the sealing station.

5. The sealing device of claim 4 wherein the control circuit includes a timer preset to carry out the operational steps when the photoelectric device has sensed the correct position of the package and the switch means to which the control circuit is responsive has been actuated.

6. The sealing device of claim 5 wherein the indexing means for setting the stop means is a pneumatically operable cylinder and piston coupled to the control circuit via solenoid-actuated valve means.

7. The sealing device of claim 6 including means for moving the stop means out of the path of the package, whereby to discharge said passage.

8. An automatically operable heat sealing device for sealing packages which comprises, a platform for receiving a package to be sealed, a sealing station located on said platform, an indexible stop means located relative to the surface of said platform for positioning a package for sealing, said stop means being indexed in home position, indexing means responsive to a signal for automatically indexing said stop means to another position to accommodate a particular sized package, sealing means located relative to said sealing station, a control circuit coupled to said sealing means and said indexing means, switch means coupled to said control circuit, said switch means being adapted for actuation by a package moving along said platform, and a monitor coupled to said control circuit comprising a photoelectric device mounted to scan the sealing station and sense when a package has been correctly positioned for sealing, such that when the correct position has been sensed and the switch means actuated, the sealing cycle is effected.

9. The sealing device of claim 8 wherein a preset timer is employed with the control circuit, whereby when the monitor has sensed the correct position of the package and the switch means has been actuated, the preset timer is activated to carry out the sealing cycle.

10. An automatically operable heat sealing device for sealing packages which comprises, a platform for receiving packages to be sealed, a sealing station located on said platform, an indexible stop means located relative to the surface of said platform for positioning a package for sealing, indexing means responsive to a signal for automatically indexing said stop means to a position to accommodate a particular sized package, said means comprising a first pneumatic cylinder and piston coupled to said stop means, a first solenoid-actuated valve coupled to one end of said first pneumatic cylinder and a second solenoid-actuated valve coupled to the opposite end of said cylinder, a solenoid-actuated second pneumatic cylinder and piston coupled to said stop means for lowering and raising said stop means relative to said platform, pivotally mounted sealing means located at said sealing station, said sealing means being operable via a solenoid-actuated pneumatic cylinder and piston coupled to said pivotally mounted sealing means, a monitor comprising a photoelectric device mounted to scan said sealing station to sense when a package has been correctly positioned, and a control circuit and timer coupled to the sealing means, the photoelectric device and to the stop indexible means, said control circuit being responsive to a signal produced when a package has reached a correct sealing position on said platform.

References Cited

UNITED STATES PATENTS 3,012,387  12/1961  Jacobs et al. _____ 53—76
3,284,987  11/1966  Sigmon _____ 53—76 X TRAVIS S. McGEHEE, *Primary Examiner.*

U.S. Cl. X.R.

53—373